United States Patent [19]

Waters

[11] 4,105,368
[45] Aug. 8, 1978

[54] FLOATING WAVE POWERED PUMP

[76] Inventor: Fred L. Waters, c/o Transworld Drilling Company, Ltd. P.O. Box 25861, Oklahoma City, Okla. 73125

[21] Appl. No.: 742,075

[22] Filed: Nov. 15, 1976

[51] Int. Cl.² .............. F04B 17/00; F04B 35/00; F16H 25/12; F16H 25/14
[52] U.S. Cl. .................... 417/53; 417/331; 417/332; 60/500; 60/506; 74/56; 74/107
[58] Field of Search ............ 417/331, 332, 53; 60/500, 506, 507; 74/56, 107

[56] References Cited

U.S. PATENT DOCUMENTS

| | | | |
|---|---|---|---|
| 306,152 | 10/1884 | Harding | 222/514 |
| 616,467 | 12/1898 | Jones | 60/398 |
| 692,396 | 2/1902 | Wilcox | 417/330 |
| 1,403,702 | 1/1922 | Melvin | 60/496 |
| 1,555,487 | 9/1925 | Sauer | 417/331 |
| 1,887,316 | 11/1932 | Lockfew | 417/330 |
| 1,925,742 | 9/1933 | Bamber et al. | 60/506 X |
| 1,938,311 | 12/1933 | Avery | 74/107 X |
| 2,711,654 | 6/1955 | Baker | 74/90 |
| 2,856,781 | 10/1958 | Forbes | 74/56 |
| 3,302,765 | 2/1967 | Hickerson et al. | 74/56 X |
| 3,359,809 | 12/1967 | Spender | 302/54 |
| 3,403,668 | 10/1968 | Schottler | 74/56 X |
| 3,487,228 | 12/1969 | Kriegel | 290/52 |
| 3,664,125 | 5/1972 | Strange | 60/398 |
| 3,752,421 | 8/1973 | Harvey | 244/102 |
| 3,818,771 | 6/1974 | Kobelt | 77/99 |
| 3,974,652 | 8/1976 | Loumark | 417/332 X |
| 4,023,515 | 5/1977 | Tharaldson | 417/332 X |
| 4,034,565 | 7/1977 | McVeigh | 60/506 |

Primary Examiner—Carlton R. Croyle
Assistant Examiner—R. E. Gluck
Attorney, Agent, or Firm—Norman P. Friederichs

[57] ABSTRACT

A hydraulic power source for harnessing energy generated by the wave motion of a body of water. A primary or main float has a plurality of secondary or satellite floats spaced outwardly therefrom. The secondary floats are each attached to one end of a plurality of lever arms, the other ends thereof being attached to a plurality of rotatable shafts carried by the primary float so that up/down motion of the lever arms is translated into rotational motion of the shafts. When placed upon a body of water, the wave motion causes the secondary floats to be displaced upwardly or downwardly relative to the primary float. The motion of the secondary floats is translated by the generally vertical movement of the lever arms to the shafts to rotate the shafts. The rotational motion of the shafts is translated into linear motion within the primary float by means of interacting cam surfaces which activate pistons of linear pumps. The linear motion of the pistons within the pumps is used to pump a hydraulic fluid from a reservoir into pressure accumulators. The pressure stored within the pressure accumulators may be selectively tapped as a source of power.

14 Claims, 7 Drawing Figures

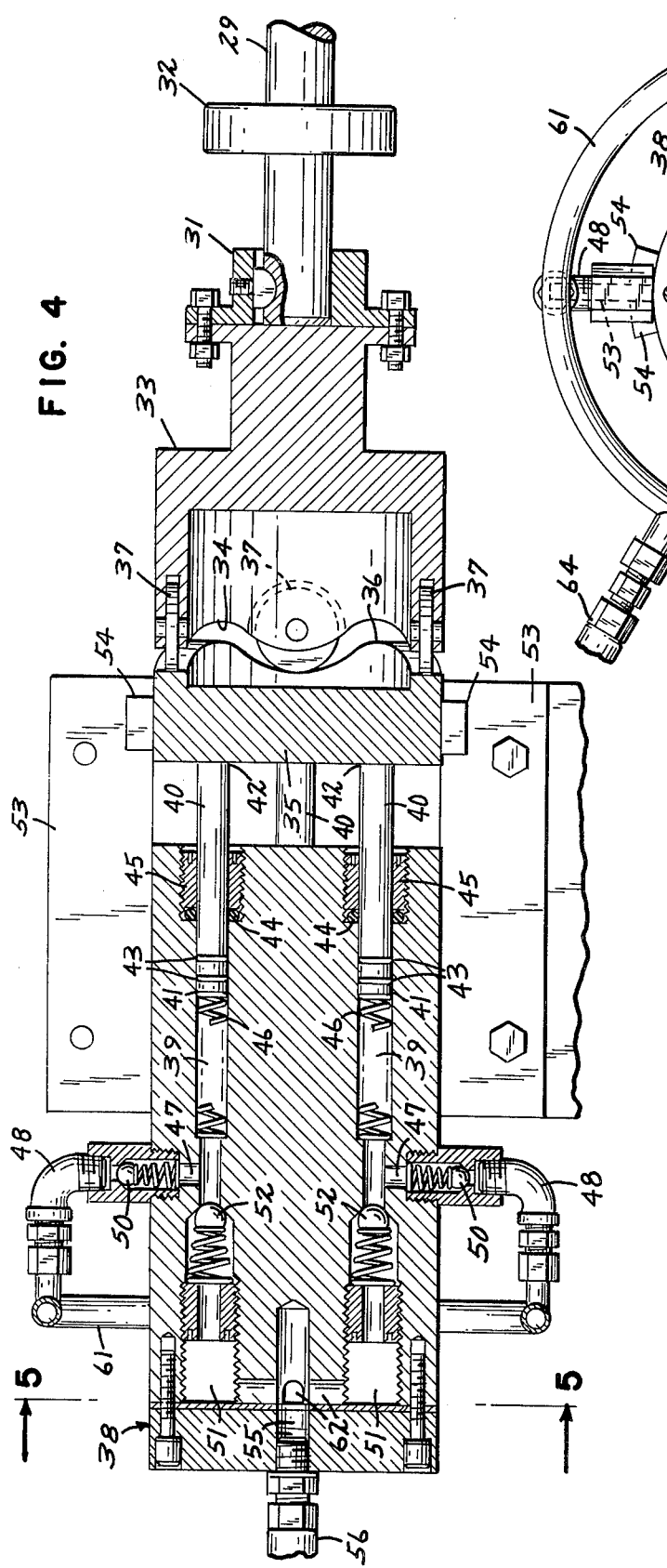

FLOATING WAVE POWERED PUMP

BACKGROUND OF THE INVENTION

1. Field of the Invention

This invention relates to a hydraulic power source for harnessing the energy generated by the wave motion of a body of water.

2. Background of the Invention

Various types of "wave motors" have been known in the art. For the most part, the prior art devices utilize a stationary platform or pier in conjunction with a float member. The motion of the float member relative to the platform is utilized to operate a piston of a fluid pump to transport the fluid to either an elevated position or a pressure storing apparatus. The fluid is thereupon utilized to drive hydraulic motors. Most of the devices of the prior art simply utilize the vertical movement of the float relative to the platform to directly drive the piston. One device (U.S. Pat. No. 616,467) attaches the float to the platform by means of a lever arm and thus operates the pump by the motion of the lever arm.

The prior art devices, however, are rather large, cumbersome pieces of machinery which require that the platform or pier remain stationary. Their usefulness is limited to a location near the shoreline where the platform can be anchored. Due to the relatively large size of the floats, heavy wave action is required to operate these devices.

The prior art devices utilize various means of translating the wave motion of the float to the pump piston. As indicated above, one device utilizes a connection between the lever arm and the piston rods. Other devices simply connect the piston rod directly to the float. Likewise, it has been known to utilize a bell crank to translate the vertical motion of the float into the horizontal motion of pistons. And yet another device utilizes a ratchet mechanism attached to bars connected to the float to drive gears to operate an air pump.

None of these mechanisms, however, have proved useful in the present invention for translating the rotary motion of the shaft into linear motion of the pistons. Other types of rotary-linear converters have been known in the art, but, for one reason or another, they have also proved to be unsatisfactory for use with the present invention.

SUMMARY OF THE INVENTION

The hydraulic power source includes a primary or main float supported upon the surface of a body of water. The primary float has a plurality of secondary or satellite floats also supported upon the surface of the body of water and surrounding the primary float. The secondary floats are attached to rotatable primary shafts journaled within the primary float by means of a plurality of lever arms extending outwardly from the primary float. On a perfectly calm body of water, these secondary floats would be maintained on the essentially same level as the primary float. Given a slight wave motion, however, the wave undulations will cause the secondary floats to oscillate in a vertical plane relative to the primary float. The up and down movement of the secondary floats relative to the primary float is translated by the lever arms to the primary shafts and results in oscillatory rotary motion of the shafts.

A rotary-linear motion converter is operatively connected to each end of the rotating primary shafts. The converter translates the rotary motion of the primary shafts into linear motion of pistons within linear fluid pumps located within the primary float. The rotary-linear converter utilizes the interaction of two cam surfaces having corresponding alternating depressions and elevations to oscillate a linear pressure plate which is restrained for linear movement within the primary float.

The pistons of the fluid pumps abut the linear pressure plates and move with the linear pressure plates. The pistons are spring-biased against the action of the cam surfaces so that the pistons will tend to return to a first, intake position after having been moved to a second, exhaust position by the interaction of the cam surfaces. Thus, continuous oscillating motion may be imparted to the pistons.

Each of the linear pumps has a fluid inlet connected to a fluid reservoir. The pistons are urged to an intake position by compression springs located within the cylinders of the pumps and hydraulic fluid enters the pistons from the reservoir. Upon the compression stroke of the piston due to the interaction of the cam surfaces, the fluid is pressurized and exits the pump through an outlet. The pressurized hydraulic fluid is thus pumped into a plurality of pressure accumulators connected to the outlets of the pumps where it is stored. The pressure accumulators have outlet valves which permit the pressure within the accumulators to be tapped as a power source to operate hydraulic rams or motors.

A particularly useful application of the present invention is found in the oil industry. The present invention may be utilized to remotely control valves in oil or natural gas lines to shut off the flow of oil or natural gas within the lines. This is accomplished by applying pressure from the pressure accumulators to either side of a valve through the use of a directional control valve to open or close the valve as desired. Damage due to leaks or blow-outs in oil lines located far at sea may thus be minimized by cutting off the flow within the lines quickly. Due to the fact that the entire apparatus of the present invention rests upon the surface of a body of water, it may be located far at sea and need not be anchored to the shore or sea bottom.

It will be understood, of course, that the present invention is not limited to such uses and may be applicable to a large variety of situations.

The amount of mechanical power generated by the hydraulic power source depends to a great extent upon the size of the primary float, the size of the secondary floats and the length of the lever arms. The amount of pressure generated depends to a large extent upon the size of the pump pistons, the number of pumps and the length of the pump stroke. Sizes and dimensions may be appropriately varied to meet particular needs in any one case. Secondary shafts may be connected to the primary shafts through gear step-up mechanisms to amplify the rotary motion of the shafts in light seas.

BRIEF DESCRIPTION OF THE DRAWINGS

FIG. 4 is a fragmentary sectional view taken generally along the line 4—4 of FIG. 3.

FIG. 5 is a transverse sectional view taken generally along the line 5—5 of FIG. 4.

DETAILED DESCRIPTION OF THE PREFERRED EMBODIMENT

Figure 1:
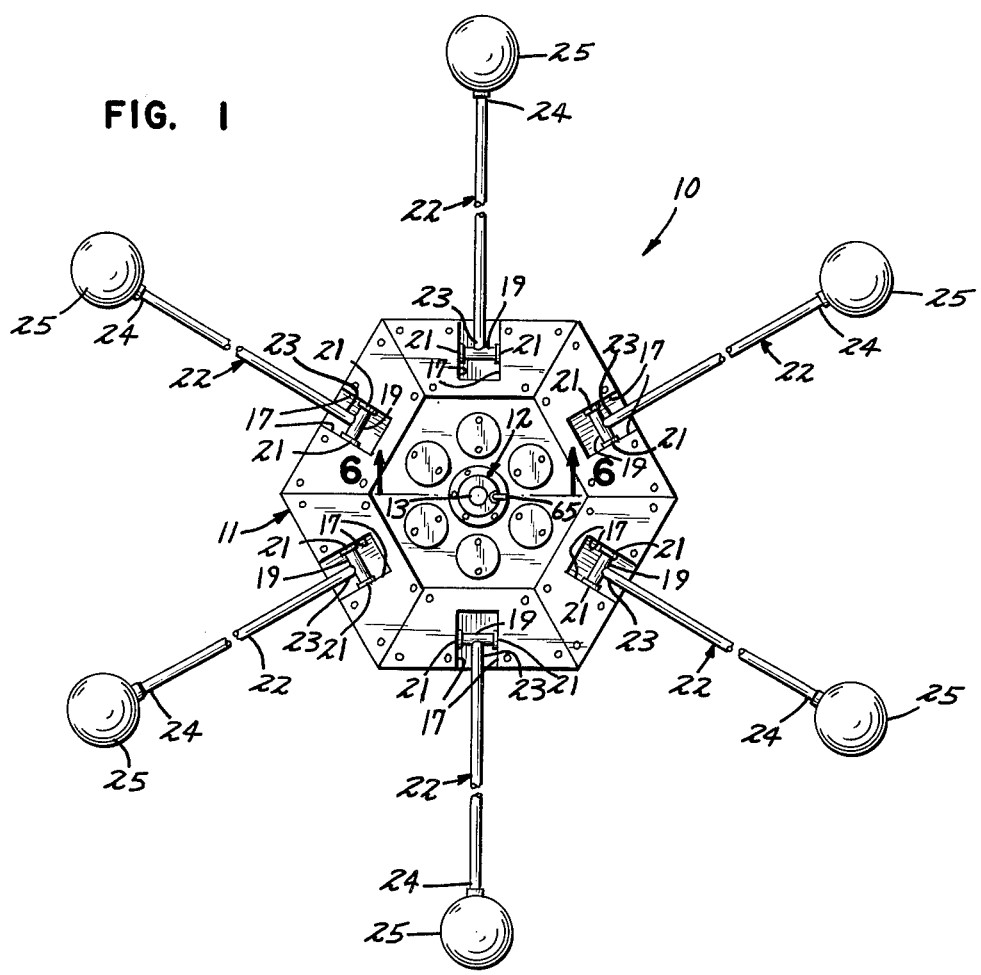
FIG. 1 is a top plan view of a hydraulic power source.
Figure 2:
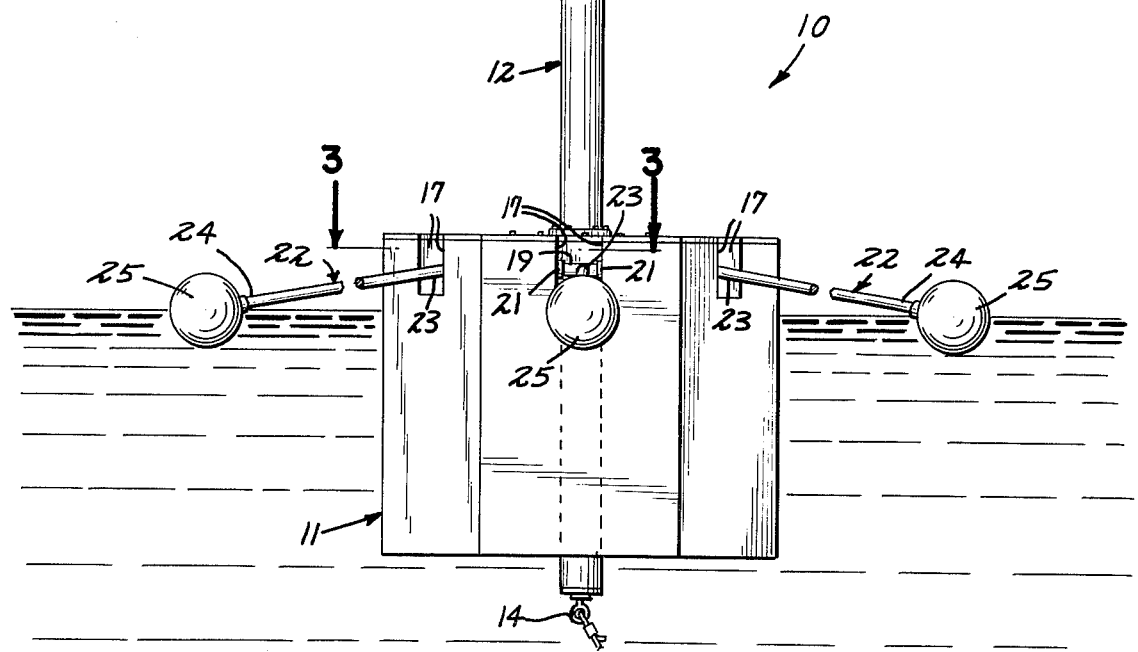
FIG. 2 is a view in side elevation of a hydraulic power source.

Referring to the drawing, wherein like numerals represent like elements throughout the several views, there is provided a hydraulic power source, generally designated as 10. The hydraulic power source 10 includes a primary float 11 having a hexagonal shape when viewed from the top, although other shapes may be utilized. A hollow king post 12 extends through the middle of the primary float 11 and is maintained generally perpendicular to the surface of the body of water upon which the primary float 11 is supported. The king post 12 is an elongated hollow cylinder, a portion of which is located above the primary float 11. A navigation light 13 is attached to the top of the king post 12 and a pad eye 14 is attached to its bottom for connection to a sea anchor (not shown) to restrain the movement of the hydraulic power source 10 when positioned upon the surface of the body of water. That portion of the king post 12 which extends above the primary float 11 serves as a fluid reservoir for storing the hydraulic fluid to be pumped into the pressure accumulators. A vent 65 is also attached to the top of the king post 12 in order that the fluid reservoir be in communication with the atmosphere. Thus, the fluid within the king post 12 is maintained at atmospheric pressure.

The primary float 11 contains a plurality of buoyancy chambers 15. The buoyancy chambers 15 are defined by the exterior of the main float 11 and a plurality of partitions 18, a partition 18 separating each adjacent buoyancy chamber 15. The partitions 18 are water-tight so as to prevent the passage of water from one buoyancy chamber 15 to another should a leak develop.

Figure 3:
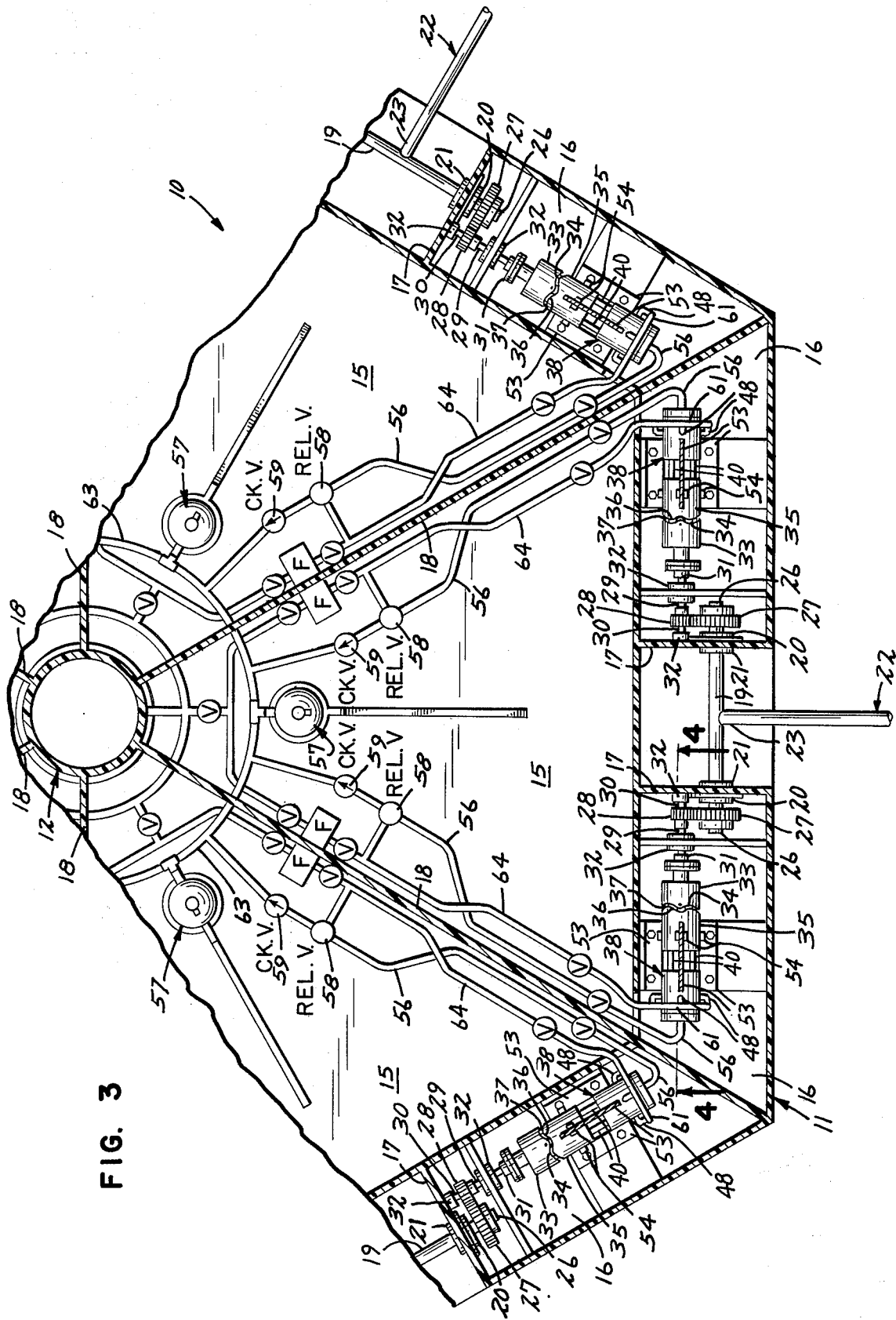
FIG. 3 is a fragmentary sectional view taken generally along the line 3—3 of FIG. 2.

Located within each buoyancy chamber 15 are two power compartments 16. The power compartments 16 associated with each buoyancy chamber 15 have end walls 17 spaced apart from one another generally centrally of the buoyancy chamber 15. The end walls 17 are water-tight so as to prevent the passage of water into the power compartments 16. A primary shaft 19 extends through the adjacent end walls 17 of each buoyancy chamber 15 and into each power compartment 16. The primary shaft 19 is journaled for rotation in bearings 20 contained in end walls 17, as seen in FIG. 3. A water seal 21 surrounding the shaft 19 at its point of entry through each of the end walls 17 prevents the passage of water into the power compartments 16. In this manner, it will be seen that the central portion of the shaft 19 is positioned between each of the power compartments 16.

Each of a plurality of lever arms 22 is attached at its first or inner end 23 to a primary shaft 19 intermediately of the paired power compartments 16 and extends outwardly of the primary float 11. The second or outer end 24 of the lever arm 22 is attached to one of a plurality of satellite or secondary floats 25. The secondary floats 25 are also supported upon the surface of the body of water by their buoyancy. The secondary floats 25 will preferably have a generally spherical configuration. Thus, a plurality of lever arms 22, each with an associated secondary float 25, will extend outwardly from the sides of the primary float 11 so as to be equally spaced around the primary float 11 in a spider or spoke-like arrangement.

Extending into each of the power compartments 16 is an end portion 26 of the shaft 19, as seen in FIG. 3. Keyed to each end portion 26 of the shaft 19 is a first toothed gear 27. A second toothed gear 28 is keyed to the first end 30 of a secondary shaft 29 journaled for rotation in bearings 32 within the power compartment 16. The first gear 27 meshes with the second gear 28 so as to operatively connect the primary shaft 19 and the secondary shaft 29. The relative size of the gears 28 and 27 may be chosen in such a manner that the rotary motion of the primary shaft 19 (imparted to it by oscillation of the secondary float 25) is amplified when trasmitted to the secondary shaft 29. This is accomplished by choosing a first gear 27 having a diameter greater than the second gear 29, as is well known. Such a gear step-up mechanism is particularly useful in areas having relatively calm wave action.

Referring to FIG. 4, attached to the second end 31 of the secondary shaft 29 is a rotary pressure plate 33 having a first cam surface 34 containing alternating depressions and elevations. The angular rotation of the secondary shaft 29 is imparted to the rotary pressure plate 33. A plurality of roller bearings 37 are journaled in the rotary pressure plate 33 in such a manner that a portion of the bearings 37 extends outwardly from the first cam surface 34. The position of the roller bearings 37 corresponds to the elevations of the first cam surface 34.

Located adjacent the rotary pressure plate 33 is a linear pressure plate 35 having a second cam surface 36 also containing alternating depressions and elevations, which can be in the form of a generally mirror image of cam surface 34. The linear pressure plate 35 is so positioned that the second cam surface 36 is disposed adjacent the first cam surface 34. The roller bearings 37 are thus positioned between the first cam surface 34 and a second cam surface 36. The second cam surface 36 defines a bearing race for the roller bearings 37.

Also located within the power compartment 16 is a linear pump 38. Again referring to FIG. 4, the pump 38 defines a plurality of cylindrical bores 39 which act as compression cylinders for pistons 40. These pistons 40 are elongated cylindrical members having an inner end 41 which extends into the cylinders 39 and an outer end 42 which extends outwardly of the pump 38. O-rings 43 are provided between the inner end 41 of the pistons 40 and the cylinders 39. A main piston seal 44 held in position by a threaded seal retainer 45 is provided between each of the pistons 40 and the cylinders 39. The cylinders 39 are thus effectively sealed from leakage upon the compression stroke of the pistons 40.

The pump 38 is positioned within the power compartment 16 adjacent the linear pressure plate 35 opposite the rotary pressure plate 33 in such a manner that the outer ends 42 of the pistons 40 abut, or are otherwise operatively connected to, the linear pressure plate 35. A compression spring 46 located within each of the cylinders 39 urges the pistons 40 in a direction toward the linear pressure plate 35. At such times as the depressions and elevations of the first cam surface 34 are aligned with the elevations and depressions, respectively, of the second cam surface 36, the compression spring 46 will be at its maximum extension. This will be referred to as the first, or intake, position of the pistons 40. At such times as the depressions and elevations of the first cam surface 34 are aligned with the depressions and elevations, respectively, of the second cam surface 36, the compression spring 46 will be at its maximum compression. This corresponds to the second, or exhaust, position of the pistons 40. It will thus be seen that the compression spring 46 urges the pistons 40 to the first, or intake, position.

The pump 38 is fixedly mounted within the power compartment 16. A plurality of guide bars 53 are attached at one end around the periphery of the linear pump 38 and extend longitudinally of the pump 38. The guide bars 53 slidably engage a plurality of channel forming members 54 which are attached about the periphery of the linear pressure plate 35. The linear pressure plate 35 is thus restrained from lateral and rotational movement but is free for straight-line movement only in a direction toward or away from the linear pump 38. Thus it will be seen that the oscillatory rotary motion of the rotary pressure plate 33 will result in oscillatory linear motion of the linear pressure plate 35 as the first and second cam surfaces 34 and 36 interact resulting in operation of the pistons 40 between the first and second positions.

As shown in FIGS. 3 and 4, each cylinder 39 has an intake port 47 attached to an intake line 48 which in turn is connected to a hydraulic fluid reservoir 49 located within the king post 12 by a reservoir outlet line 64 and an intake manifold 61 associated with each power compartment 16. As indicated previously, the hydraulic fluid reservoir 49 is located within that portion of the king post 12 extending above the primary float 11. The elevated position of the hydraulic fluid reservoir 49 relative to the cylinders 39 enables gravity feed of hydraulic fluid from the reservoir 49 into the cylinders 39. Backflow from the cylinders 39 into the intake line 48 upon the compression stroke of the pistons 40 is prevented by intake check valves 50 positioned between the intake port 47 and the intake line 48, shown in FIG. 4. The intake check valve 50, as is well known in the art, consists of a ball valve urged against a valve seat by a compression spring.

Each of the cylinders 39 also contains an outlet port 51. When the pistons 39 are in the first, or intake, position, hydraulic fluid enters the cylinders 39 through the intake port 47. Upon the compression stroke of the piston 40, hydraulic fluid is forced through the outlet port 51. An outlet check valve 52 prevents backflow of exhausted fluid into the cylinder 39. An outlet manifold 62 leading to a common outlet port 55 connects all outlet ports 51 of each pump 38.

An outlet line 56 is attached to the common outlet port 55 at one end and at the other end to an accumulator manifold 63 communicating with a plurality of pressure accumulators 57, as seen in FIG. 3. A pressure relief valve 58 connects the outlet line 56 and the reservoir outlet line 64 as a safety measure in the event of an excessive build-up of pressure within the outlet line 56. A third check valve 59 is positioned between each outlet line 56 and the accumulator manifold 63 to prevent backflow of fluid from the accumulators 57 into the outlet lines 56.

Figure 6:
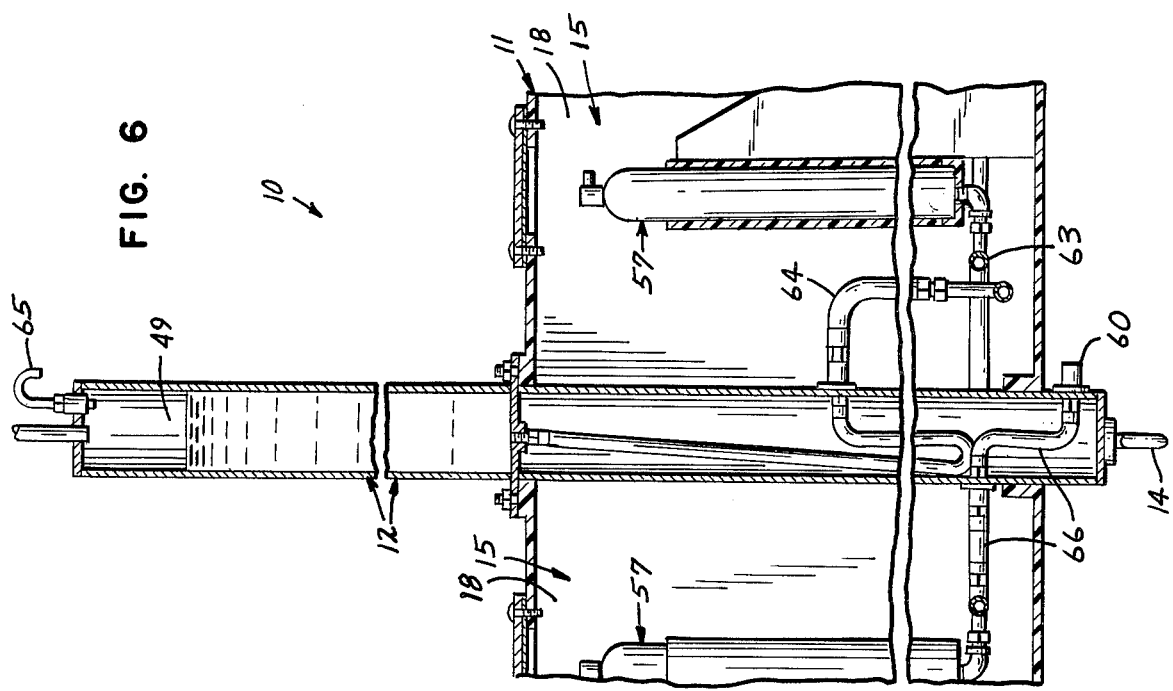
FIG. 6 is a fragmentary sectional view taken generally along the line 6—6 of FIG. 1.

Accumulators 57 are positioned within the buoyancy chambers 15 adjacent the king post 12 as seen in FIG. 1. One accumulator 57 is located within each of the buoyancy chambers 15 and all accumulators 57 are in fluid communication through the accumulator manifold 63. As is well known in the art, the accumulator 57 consists of a casing having a gaseous head which will be compressed upon addition of hydraulic fluid into the accumulator 57. As more hydraulic fluid is added to each of the accumulators 57, the pressure of the gaseous head will be increased thus resulting in an increase in the pressure of the hydraulic fluid. The accumulators 57 are also in fluid communication with an accumulator outlet 60 located on the bottom portion of the king post 12 through an accumulator outlet line 66 connected between the accumulator manifold 63 and the accumulator outlet 60 as seen in FIG. 6. The pressure stored within the accumulators 57 may be tapped to operate hydraulic rams, motors or the like by a connection to the accumulator outlet 60.

The operation of the hydraulic power source is best described by reference to the schematic FIG. 8 of the drawings. FIG. 8 shows the operation of one of the secondary floats and the associated equipment designated at A. It will be understood that the other secondary floats and associated equipment designated at B-F operate in the same manner. The schematic shown in FIG. 8 is not an actual representation of the exact form of the preferred embodiment, but is here produced to simplify the explanation of the operation of the present invention.

In operation, the wave motion of a body of water causes the secondary floats 25' to oscillate in a generally vertical plane relative to the main float (not shown in FIG. 8). This is due primarily to the height variations between the valleys and crests of the waves. As a wave moves past the hydraulic power source, the secondary float 25' will first be elevated relative to the primary float and then lowered. The oscillatory motion of the secondary float 25' in a generally vertical plane relative to the primary float results in angular motion of the lever arm 22'. The angular motion of the lever arm 22' thus creates a moment about the primary shaft 19' resulting in oscillatory angular motion of the shaft 19'.

The rotary movement of the shaft 19' is imparted to the rotary pressure plates 33'. As the rotary pressure plates 33' are angularly displaced, the first cam surfaces interact with the second cam surfaces until the elevations of each are aligned. Linear motion is thus imparted to the linear pressure plates 35' which results in the compression stroke of the pistons 40'.

Fluid is supplied to the pumps 38' from the reservoir 49' through the reservoir outlet line 64', the intake manifolds 61' and the intake line 48' through the intake check valve 50'. Upon the compression stroke of the pistons 40', the fluid is pressurized and exhausted through common outlet ports 55'.

As the relative positions of the rotary pressure plates 33' and the linear pressure plates 35' change due to the angular oscillation of the shaft 19', the elevations of the first cam surfaces will begin to align with the depressions of the second cam surfaces. The compression springs associated with the pistons 40' will expand and urge the pistons 40' outwardly from the exhaust position into the intake position. Fluid is then taken into the cylinders and the cycle begins again.

Figure 7:
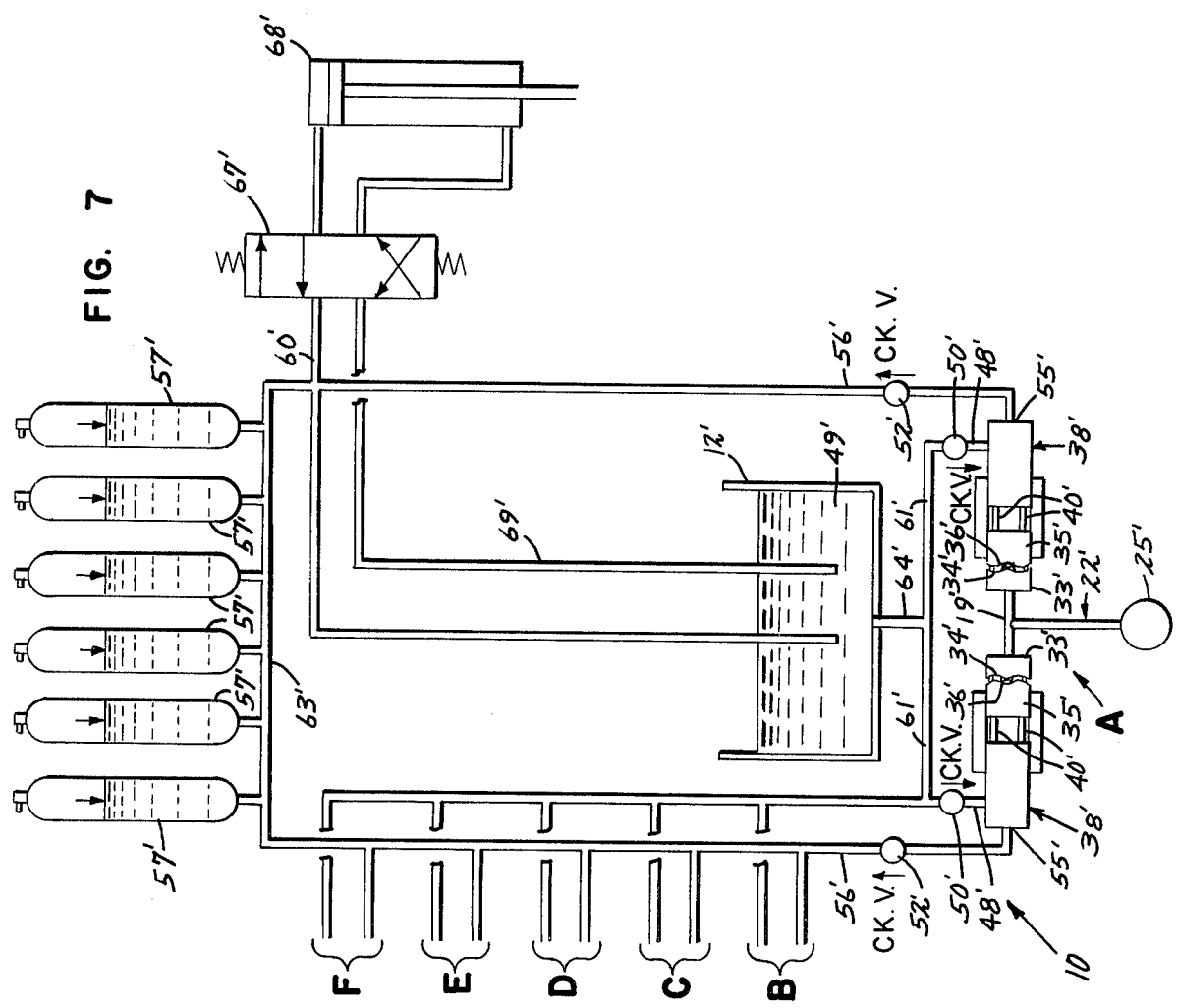
FIG. 7 is a schematic view illustrating the operation of the invention.

As the pumping cycle continues, pressurized fluid will be pumped into the outlet line 56' and thus into the accumulator manifold 63'. The pressure will be stored in the accumulators 57'. The pressure thus stored may be tapped through the accumulator outlet 60'. As shown in FIG. 7, a hydraulic ram or other load 68' may be operated by connection to the accumulator outlet 60'. The pressure stored within the accumulator 57' may be applied to either side of the ram or load 68' by operation of a directional control valve 67'. The hydraulic fluid, having exhausted its pressure by action upon the load 68' may be returned through a return line 69' to the reservoir 49'. It will be understood, however, that the system may also be an open system where the exhaused hydraulic fluid may simply be discharged.

While the preferred embodiment of the present invention has been described, it will be understood, of course, that the present invention is meant to be limited in scope only by the appended claims.

What is claimed is:

1. A hydraulic power source for harnessing energy generated by the wave motion of a body of water, comprising:
   (a) a primary float;
   (b) a plurality of rotatable primary shafts carried by said primary float;
   (c) a like plurality of lever ams attached at a first end to one each of said primary shafts and extending generally horizontally outwardly from said primary float;
   (d) a like plurality of secondary floats, one of said secondary floats being attached to a second, opposite end of one each of said lever arms oppositely of said primary float;
   (e) a plurality of linear pumps located within said primary float, said pumps having pistons and cylinders, each of said cylinders having a fluid inlet and a fluid outlet;
   (f) drive means operatively connecting each of said linear pumps to one of said primary shafts for converting rotary motion of said primary shafts to linear motion of the pistons of said pumps;
   (g) a hydraulic fluid source in fluid communication with the inlets of the cylinders of said pumps for supplying hydraulic fluid thereto; and
   (h) pressure storing means in fluid communication with the outlets of the cylinders of said pumps for accumulating pressurized fluid exhausted from said pumps.

2. The hydraulic power source of claim 1, wherein said drive means comprises:
   (a) a rotary pressure plate and gear drive, said gear drive operatively connecting said one primary sahft and said rotary pressure plate for rotationally driving said rotary pressure plate, said rotary pressure plate having a first cam surface;
   (b) a linear pressure plate located adjacent said rotary pressure plate and being operatively connected to the pistons of said pump, said linear pressure plate being restrained for straight line movement and having a second cam surface of said rotary pressure plate;
   (c) a plurality of bearings positioned between each of said cam surfaces; and
   (d) means for biasing said linear pressure plate toward said rotary pressure plate.

3. The hydraulic power source of claim 2, wherein each of said cam surfaces has a plurality of alternating depressions and elevations.

4. The hydraulic power source of claim 2, wherein said means for biasing said linear pressure plate toward said rotary pressure plate comprise compression springs located within the cylinders of said pump, said compression springs urging the pistons of said pump outwardly against said linear pressure plate.

5. The hydraulic power source of claim 1, wherein said drive means comprises:
   (a) a secondary shaft located adjacent said one primary shaft, said secondary shaft having first and second ends, said first end of said secondary shaft being operatively connected to said one primary shaft through a gear step-up mechanism;
   (b) a rotary pressure plate connected to said second end of said secondary shaft for rotation, said rotary pressure plate having a first cam surface;
   (c) a linear pressure plate located adjacent said rotary pressure plate and being operatively connected to the pistons of said pump, said linear pressure plate being restrained for straight line movement and having a second cam surface facing said first cam surface of said rotary pressure plate;
   (d) a plurality of bearings positioned between each of said cam surfaces; and
   (e) means for biasing said linear pressure plate toward said rotary pressure plate.

6. The hydraulic power source of claim 5, wherein each of said cam surfaces has a plurality of alternating depressions and elevations.

7. The hydraulic power source of claim 5, wherein said means for biasing said linear pressure plate toward said rotary pressure plate comprise compression springs located within the cylinders of said pump, said compression springs urging the pistons of said pump outwardly against said linear pressure plate.

8. The hdyraulic power source of claim 1, wherein said hydraulic fluid source comprises a fluid reservoir attached to said primary float, said fluid reservoir being positioned above said pumps.

9. The hydraulic power source of claim 1, wherein said pressure storing means comprise a plurality of pressure accumulators each having a gaseous head and a check valve to prevent the backflow of pressurized fluid from said accumulators.

10. A hydraulic power source for harnessing energy generated by the wave motion of a body of water, comprising:
    (a) a primary float;
    (b) a plurality of rotatably primary shafts journaled for rotation in said primary float;
    (c) a like plurality of lever arms attached at first ends to one each of said primary shafts and extending generally horizontally outwardly from said primary float;
    (d) a like plurality of secondary floats, one of said secondary floats being attached to a second end of one each of said lever arms;
    (e) a plurality of linear pumps located within said primary float, said pumps having pistons and cylinders, each of said cylinders having a fluid inlet and a fluid outlet;
    (f) a plurality of drive meachanisms operatively connecting each of said pumps to one of said primary shafts, each of said drive meachnisms comprising:
      i. a secondary shaft located adjacent said one primary shaft, said secondary shaft having first and second ends, said first end of said secondary shaft being operatively connected to said one primary shaft through a gear step-up mechanism;
      ii. a rotary pressure plate connected to said second end of said secondary shaft, said rotary pressure plate having a first cam surface;
      iii. a linear pressure plate located adjacent said rotary pressure plate and being operatively connected to the pistons of said pump, said linear pressure plate being restrained for straight line movement and having a second cam surface facing said first cam surface of said rotary pressure plate;

iv. a plurality of bearings positioned between each of said cam surfaces; and v. means for biasing said linear pressure plate toward said rotary pressure plate;

(g) a hydraulic fluid reservoir connected to said primary float and being elevated relative to said pumps, said reservoir being in communication with the inlets of the cylinders of said pumps; and (h) pressure storing means in communication with the outlets of the cylinders of said pumps for accumulating pressurized fluid exhausted from said pumps.

11. The hydraulic power source of claim 10, wherein each of said cam surfaces has a plurality of alternating depressions and elevations.

12. The hydraulic power source of claim 10, wherein said means for biasing said linear pressure plate toward said rotary pressure plate comprise compression springs located within the cylinders of said pump, said compression springs urging the pistons of said pump outwardly against said linear pressure plate.

13. The hydraulic power source of claim 10, wherein said pressure storing means comprise a plurality of pressure accumulators each having a gaseous head and a check valve to prevent backflow of pressurized fluid from said pressure accumulators.

14. A method of harnessing energy generated by the wave motion of a body of water comprising the steps of:

(a) supporting a primary float having a plurality of secondary floats attached by lever arms to rotatable shafts carried by the primary float upon a body of water;

(b) oscillating said secondary floats relative to said primary float thereby imparting oscillatory rotary motion to the shafts;

(c) converting the oscillatory rotary motion of the shafts to linear motion of pistons of pumps;

(d) pumping hydraulic fluid with the pumps; and (e) storing the hydraulic fluid thus pumped into pressure storing devices for selective use thereafter.

* * * * *

UNITED STATES PATENT AND TRADEMARK OFFICE
CERTIFICATE OF CORRECTION

PATENT NO. : 4,105,368
DATED : August 8, 1978
INVENTOR(S) : Fred L. Waters

It is certified that error appears in the above-identified patent and that said Letters Patent are hereby corrected as shown below:

Column 7, line 4, change "exhaused" to --exhausted--.

IN THE CLAIMS:

Claim 2, line 5, change "sahft" to --shaft--.
Claim 10, line 5, change "rotatably" to --rotatable--.
Claim 10, line 18, change "meachanisms" to --mechanisms--.
Claim 10, line 20, change "meachanisms" to --mechanisms--.

Signed and Sealed this

Thirteenth Day of March 1979

[SEAL]

Attest:

RUTH C. MASON
*Attesting Officer*

DONALD W. BANNER
*Commissioner of Patents and Trademarks*